United States Patent
Lobley et al.

(10) Patent No.: US 6,765,886 B1
(45) Date of Patent: Jul. 20, 2004

(54) CALL SET-UP AND SERVICE INVOCATION IN TELECOMMUNICATIONS NETWORKS

(75) Inventors: Nigel Lobley, Ipswich (GB); John M. Cullen, Bury St. Edmunds (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 08/750,870

(22) PCT Filed: Jun. 21, 1995

(86) PCT No.: PCT/GB95/01456

§ 371 (c)(1),
(2), (4) Date: Feb. 21, 1997

(87) PCT Pub. No.: WO95/35632

PCT Pub. Date: Dec. 28, 1995

(30) Foreign Application Priority Data

Jun. 21, 1994 (EP) .............................. 94304505

(51) Int. Cl.[7] .............................................. H04L 12/50
(52) U.S. Cl. ...................................... 370/329; 370/384
(58) Field of Search ................................ 370/254, 259, 370/260, 261, 263, 264, 270, 271, 310, 323, 325, 328, 329, 346, 348, 360, 373, 377, 384, 385; 379/201, 214, 219, 220, 210, 211, 212; 455/422, 432, 433, 445, 466, 412, 413, 414, 417

(56) References Cited

U.S. PATENT DOCUMENTS

| | | | |
|---|---|---|---|
| 4,910,766 A | | 3/1990 | Ogino et al. |
| 5,142,654 A | * | 8/1992 | Sonberg et al. .............. 455/433 |
| 5,177,780 A | * | 1/1993 | Kasper et al. ............... 455/413 |
| 5,313,515 A | * | 5/1994 | Allen et al. .................. 455/413 |
| 5,345,502 A | | 9/1994 | Rothenhofer |
| 5,414,752 A | * | 5/1995 | Jonsson ....................... 455/445 |
| 5,440,614 A | * | 8/1995 | Sonberg et al. .............. 455/432 |
| 5,473,671 A | * | 12/1995 | Partridge, III ............... 455/445 |
| 5,506,888 A | * | 4/1996 | Hayes et al. ................. 455/445 |
| 5,579,379 A | * | 11/1996 | D'Amico et al. ........... 379/112 |
| 5,586,177 A | * | 12/1996 | Farris et al. ................. 379/230 |
| 5,664,005 A | * | 9/1997 | Emery et al. ................ 455/422 |

FOREIGN PATENT DOCUMENTS

| | | |
|---|---|---|
| EP | 0 518 344 A2 | 6/1992 |
| WO | 93/16543 | 8/1993 |

OTHER PUBLICATIONS

International Search Report.
F.G. Oram et al.: "Service Location Tradeoffs in Intelligent Networks"; International Switching Symposium; 1990; vol. IV; pp. 63–69.
K. Giridharagopal et al.; "Teletraffic Science for New Cost–Effective Systems, Networks and Services"; ITC–12 Proceedings of the Twelfth International Teletraffic Congress; Jun. 1–8, 1998; vol. 12; pp. 447–454.

* cited by examiner

*Primary Examiner*—Kwang Bin Yao
(74) *Attorney, Agent, or Firm*—Nixon & Vanderhye P.C.

(57) ABSTRACT

A telecommunications network is provided, including a switch configured such that a request from a first network termination to establish a communications link with a second network termination is directed to a service processor which directs the switch to establish the link. This enables the user terminal to direct service and call setup requests directly to the service processor, the switch not being involved with the call or service request until the service processor instructs it to participate, thereby minimizing the establishment and allocation of resources until it is clear that such resources are required. A call can therefore be validated before any communications links are established, thus potentially offering economies in the operation of the system.

19 Claims, 3 Drawing Sheets

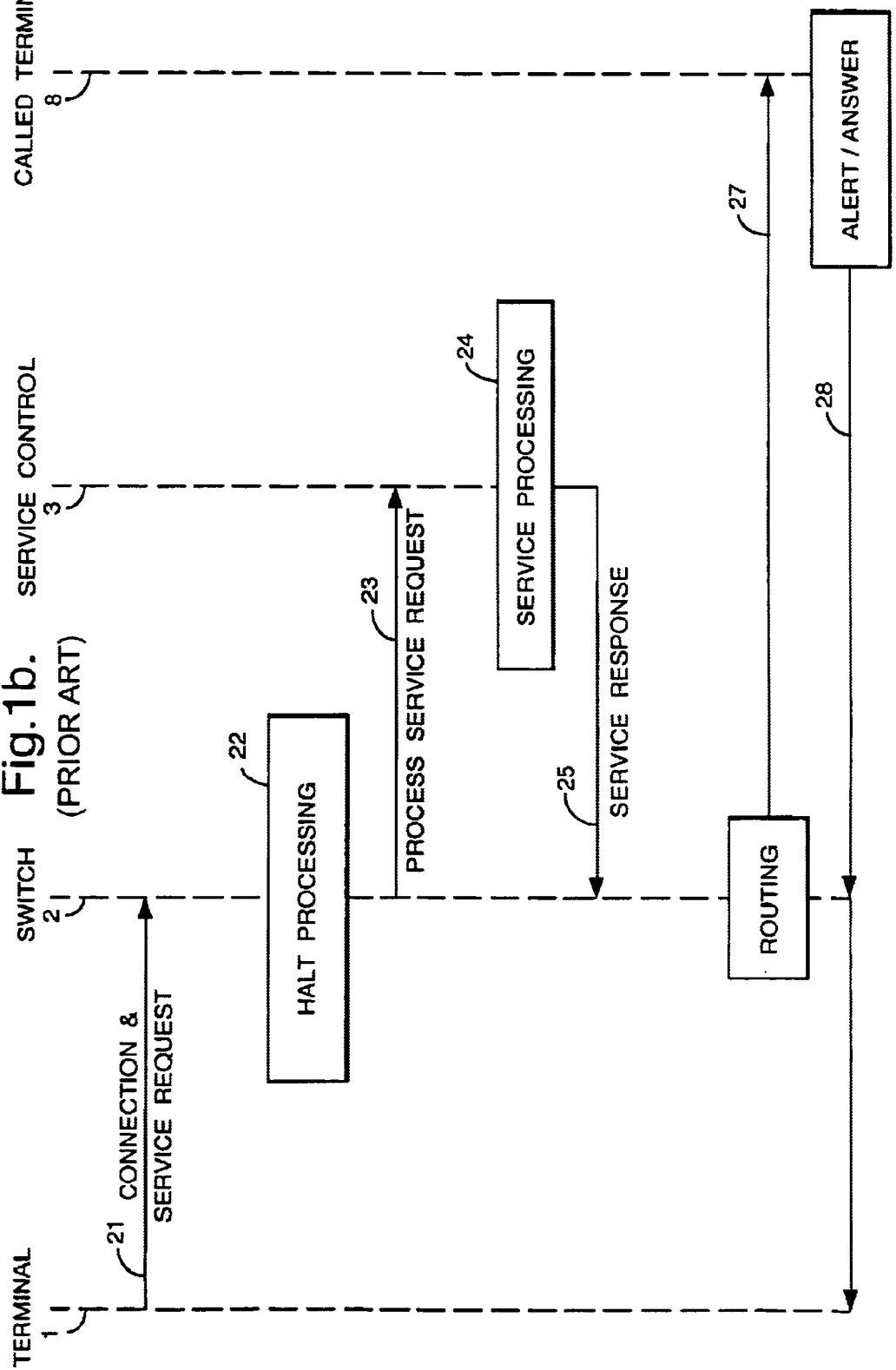

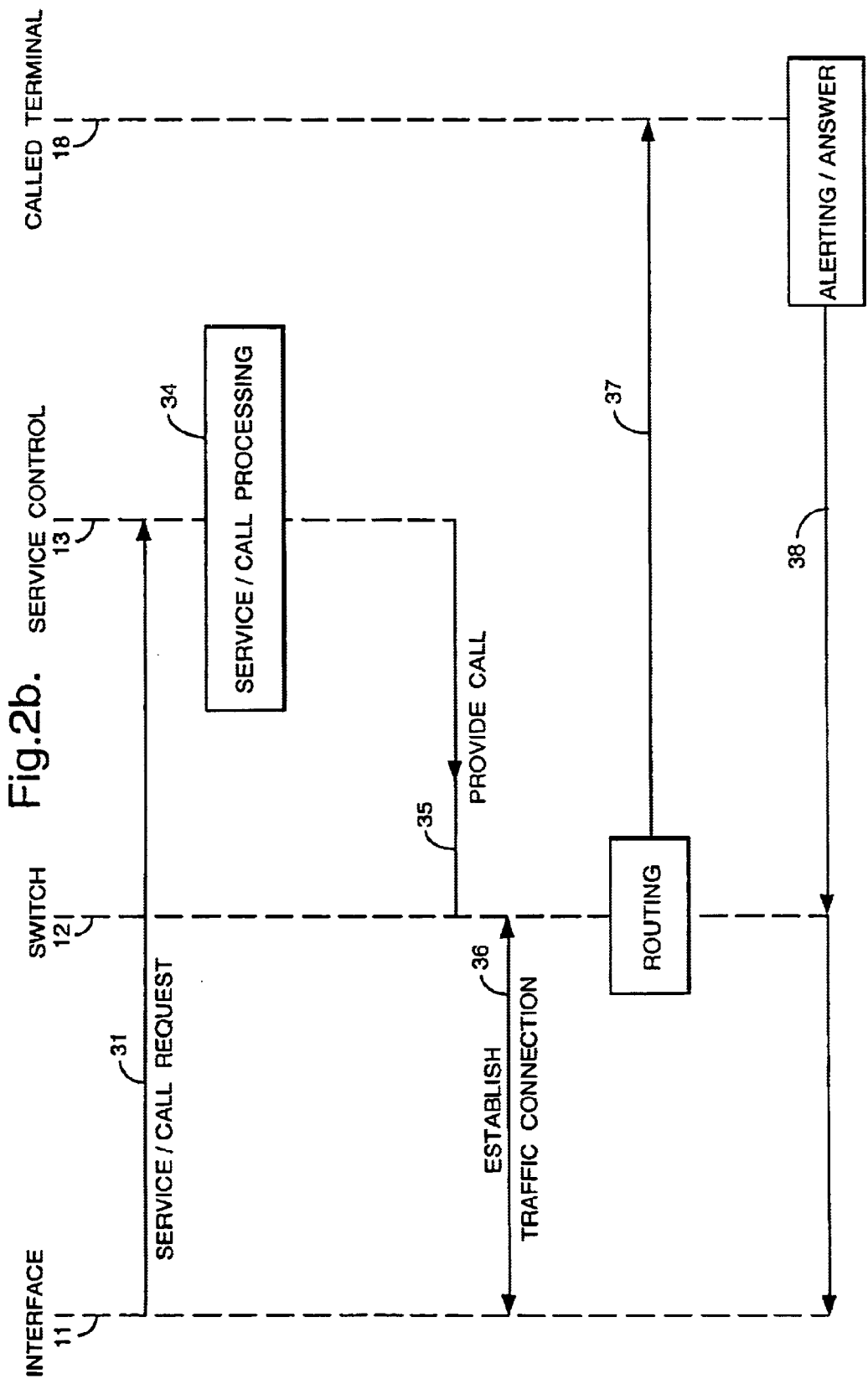

CALL SET-UP AND SERVICE INVOCATION IN TELECOMMUNICATIONS NETWORKS

BACKGROUND OF THE INVENTION

1. Field of the Invention

The present invention relates to call set-up and service invocation in telecommunications networks, in particular to Intelligent Networks (IN)-based mobile telecommunications networks.

2. Description of Related Art

There is currently considerable activity in international standards bodies (CCITT, ISO, etc.) and elsewhere in developing Intelligent Network standards and implementations. Put simply, the basis of an intelligent network is to separate service provision from switching functionality in telecommunications networks. Typically, the processing required to implement network services is provided by processors which are physically and logically separate from the switching infrastructure and control it. This allows for rapid creation and introduction of new services without their design or implementation being excessively constrained by the characteristics of the network switches. In particular, a service may be provided throughout a network without the need to modify every individual network switch.

In present day IN standards (CCITT Capability Set 1 (CS1) and implementations the logical platform for launching all IN services is a "Basic Call State Model" (BCSM) modelled in the software of each IN switch in a network. The BCSM defines a finite number of states in the lifetime of a telecommunication call, e.g. off-hook, collect digits, etc. Within the BCSM a number of Detection Points (DPs) are identified, at which certain events can trigger a switch to suspend its call processing and refer to service control entities for further instructions and service-request processing. The service control entity can then control the switch to allow it to continue, terminate or modify its call processing according to the service requested.

Service control entities are able to modify the call processing by performing further processing. For example:

a) Performing checks upon the validity and account details of the calling user's identity;

b) Obtaining further information to aid call completion: this may include obtaining the routing number, comparing service requests for compatibility, and checking the called party's status, e.g. whether already engaged on another call, and whether diversion or a mailbox facility is available.

If a service control entity determines from these further processing steps that a call is to be made, it then returns control of the call to the switch and the call set-up continues with routing, alerting and answer. The elements of the call set-up procedure may have been modified by the service control entity, e.g. if a call diversion is in operation for the called number, or differentiated ringing tones are in use by the called party for different calling numbers. All service and call requests are initially handled by the switch, the operation of the service control entity being determined by the current status of the switch's BCSM.

Intelligent Networks have great potential for offering advanced network services in the future. It has been proposed to use these principles as the basis for future mobile telecommunication systems (as well as fixed systems) and while a number of enhancements needed to achieve this have already been identified, further changes will be required. A number of systems have been developed to make use of IN principles to provide more efficient call connections and other, non-call, services. In particular, reference is made to Patent Specifications WO93/16543 (Ericsson), and U.S. Pat. No. 4,910,766 (Ogino), and Giridharagopal: "Intelligent Networks; Demands on Provisioning and Performance": *Proceedings of the 12th InternationalTeletraffic Congress*, No 1, 1989 (Amsterdam), pages 447 to 454. The systems described in these documents all route service requests, by way of a local switch, to a "Service Control Centre" which then controls further trunk switching, or other services.

A generalised description of these current techniques of intelligent network call set-up is illustrated schematically in FIGS. 1a and 1b. As shown in FIG. 1a the logical interconnection of the schematically illustrated telecommunications network is as follows: a terminal 1 is connected to a switch 2 by a communications link 4, and the switch 2 is connected to a service control unit 3 by means of a control link 6, and to other terminals 8, by means of a communications link 5, either directly or through other switches. The logical communications links 4, 5 are carried over physical links, which may be permanent (wired) links to fixed terminals or may be dynamically variable links having no permanent physical existence except when required to form a communications connection, for example the radio links in a mobile radio network, or the links in the fixed trunk network (in which the individual physical links are only allocated to individual end-to-end calls for the duration of those calls).

FIG. 1b shows a flow diagram for the operation of the system of FIG. 1a. A call or other service request is directed by a user from the terminal 1 to the switch 2 (step 21), over the communications link 4. If a call request is made requiring further processing, the switch recognises this and switch processing is interrupted (step 22). The switch 2 then directs such a request for further processing of the call to the service control unit 3 (step 23), by way of the control link 6. The service control unit 3 provides the checking and further computation required to create instructions for the switch 2 to complete the call request or to perform some other service request (step 24). In the case of a call request, the service control unit 3 then returns the required instructions to the switch (step 25) to enable the call to be routed and completed (step 27), by allocating a further communications link 5 in order to complete the communications connection. In practice there will be several interconnected switches 2, each serving a number of terminals 1, and each having access to one or more service control units 3 providing different services. The remote terminal 8 is then alerted to the call and responds (step 28).

On initiation of a request for a call or other transaction (e.g. a service request) a communications connection, capable of carrying both signalling and call traffic, is established using the communications link 4 between the terminal 1 and the switch 2. Resources in the switch 2 are then dedicated to completion of the connection required. However, the resources may not be required if the service processing step 24 determines that the communications connection 5 to the remote terminal 8 is not to be completed. When the switch 2 requests processing from the service control unit 3, the service control unit 3 may fail the call and cause the switch 2 to release the connection link 4 due to a service mismatch, customer specific service (such as outgoing calls barred) or called party terminal state (such as the busy condition). This will mean that, in addition to a signalling channel, a traffic channel will have been connected on the communications link 4 from the user terminal 1 to the switch 2 and in the switch 2 itself, and then not used. For a mobile telecommunications system, such as a cellular radio system, this is of significance because the communications link 4 is not permanently allocated to the terminal 1 as it would be in a fixed system. Instead, a radio channel is only allocated when a terminal 1 requires it. Whilst allocated to one call attempt, these resources cannot be used by other call attempts, which may then fail for lack of available capacity.

SUMMARY OF THE INVENTION

According to a first aspect of the invention there is provided a switched mobile telecommunications network for providing communications connections between mobile network terminations and other network terminations, the network comprising:

one or more mobile network terminations;
   service processing means for providing services to or for the mobile network terminations;
   the service processing means being initially accessible by service requests from the mobile network terminations by signalling connections, without establishment of a communications connection with the mobile network termination;
   and switching means controllable by the service processing means in order to establish a communications connection with the originating mobile network terminal only if required by the service requested by the mobile network termination.

(It should be noted that the "other" network terminations referred to above may include both mobile and fixed network terminations).

This invention enables a mobile user terminal to direct service requests (including call set-up requests) directly to the service processing means, the switch not being involved with the call or service request unless the service processing means then instructs it to participate. Instructions such as call connection may require use of the switch capability, but other, non-call-related instructions, such as setting up a call divert service, will not do so. Certain other functions, such as accessing a voice mail box, may require a communications connection only between the network termination and a component independent of the main switching function. This invention effectively migrates call and service control functionality from the switch into the service processing means, with the switch's functionality being reduced to a basic switch 'matrix'. Because, in a mobile telecommunications system, the links between mobile terminals and switches are not permanently dedicated to individual terminals, the invention also allows the establishment and allocation of resources to be deferred until it is clear that such resources are required.

According to a second aspect of the invention, there is provided a method of operating a switched mobile telecommunications network, the method being such that all service requests are initially directed from their originating network terminations by establishing a signalling connection to a service processing means, without establishment of a communications connection with the mobile network termination, and the service processing means provides services to the network termination over the signalling connections, the service processing means also controlling switching means to establish a communications connection with the respective network termination only if required by the service requested.

In this specification the term "service request" embraces a request from a mobile network termination to establish a communications connection with a second network termination. When the service request is such a request, the service request is directed to the service processing means which controls switching means to establish the required communications connection. The second network termination to which the mobile network termination is connected need not necessarily be the one requested. For example, the user of the requested second termination may have diverted incoming calls to another termination.

When a request from a mobile network termination to establish a service not requiring a communications connection (i.e. only a signalling connection) is directed to the service processing means, the service processing means will provide the service without establishing a full communications connection to the network termination. The service processing means may transmit a control message to the mobile network termination.

In one arrangement the service processing means, on receiving an executable call request from a first mobile network termination, establishes a communication connection through a switching means between the first network termination and a second network termination, and on receiving a non-call service request or a non-executable call request establishes a communication connection with a network service termination.

BRIEF DESCRIPTION OF THE DRAWINGS

A preferred embodiment of the invention will now be described by way of example, and with reference to the accompanying drawings, wherein:

FIG. 1b is a flow chart representing signalling during call set-up/service request in the telecommunications network of FIG. 1a;

FIG. 2b is a flow chart illustrating signalling during call set-up/service request in the telecommunications network of FIG. 2a.

DETAILED DESCRIPTION OF EXEMPLARY EMBODIMENTS

Figure 1A:
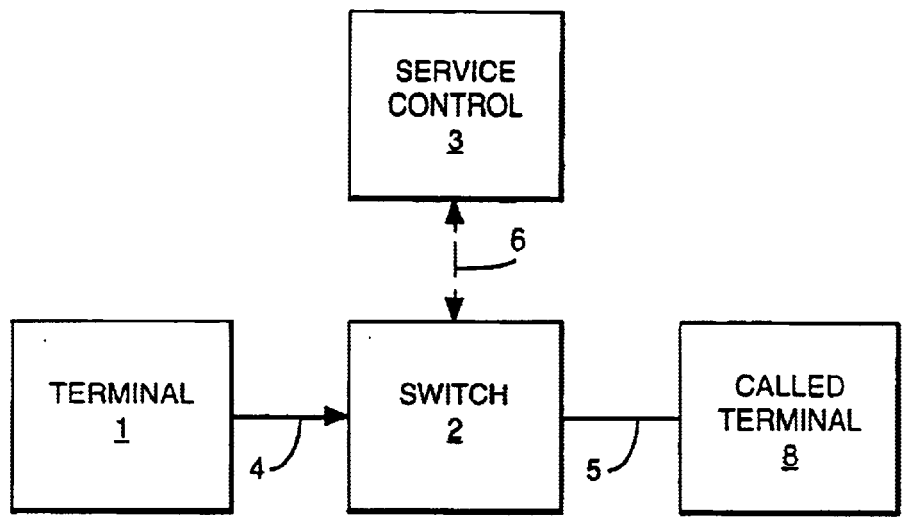
FIG. 1a is a schematic block diagram of the prior art telecommunications network discussed above.

The arrangement and operation of the prior art network of figures 1a and 1b are discussed above.

Figure 2A:
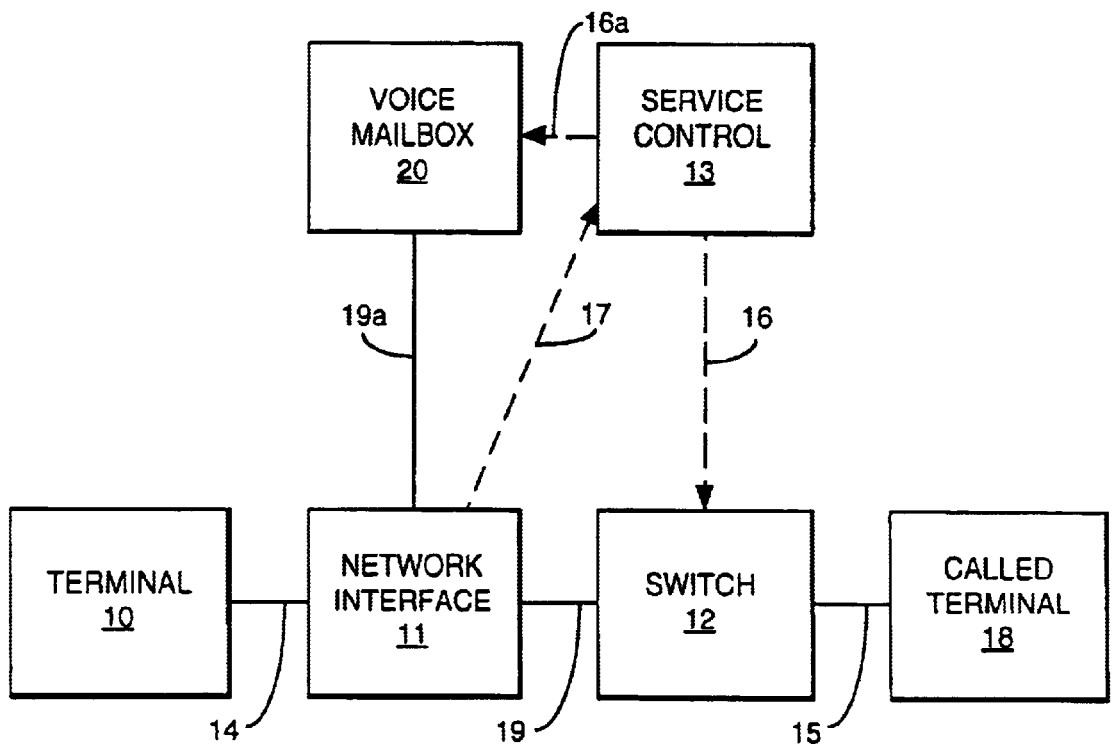
FIG. 2a is a schematic block diagram of a mobile telecommunications network according to the preferred embodiment of the invention.

Referring to FIG. 2a, a mobile telecommunications network comprises a terminal 10, a network interface unit 11, a switch 12, a service control unit 13, a remote terminal 18 and a voice mailbox 20 associated with the terminal 10. The switch 12 is configured such that a communications connection 19 can be established between the network interface unit 11 and the switch 12, and a further communications connection 15 can be established between the switch 12 and the remote terminal 18, either directly or through other switches (not shown). A communications connection (not shown) may also be established between the switch 12 and the voice mailbox 20. The terminal 10 is connected to the network interface unit 11 by a communications link 14, which corresponds to the link 4 in FIG. 1a. The network interface unit 11 is typically a base site transceiver in a mobile network (which is dedicated to the terminal 10 only temporarily, until the mobile unit is handed over to another base site or is shut down), and it can be connected to the switch 12 by a communications connection 19 under the control of the service control unit 13. A further communications connection 19a can be established between the voice mailbox 20 and the network interface unit 11, not involving the switch 12.

A signalling link 17 exists directly between the network interface unit 11 and the service control unit 13. The service control unit 13 includes among its functions control of the switch 12, through a signalling link 16, to establish communications connections over the communications links 19, 15. All control of the switch is handled by the service control unit 13. The service control unit 13 can also, through a signalling link 16a, establish a communications connection 19a between the voice mailbox 20 and the network interface unit 11.

The flow diagram of FIG. 2b illustrates the information flows between the calling terminal 11, the switch 12, the service control unit 13, and the remote terminal 18, during establishment of a call. At step 31 the user terminal 10 directs a call set-up or service request directly to the service control unit 13, rather than via the switch 12 as in the prior art arrangement of FIG. 1a and 1b. The call set-up or service request is passed direct from the network interface unit 11 to the service control unit 13 without any involvement of the switch 12. The service control unit 13 processes the request (step 34) and then sends the required service and call instructions to the switch 12 (step 35) to enable the call to be processed e.g. by establishing a communications connection 19 in the backward direction (to the network interface unit 11) (step 36). Another communications connection 15 is set up in the forward direction (to the remote terminal 18) (step 37). Once the connections 19, 15 have been established the call is completed as normal (with the remote terminal 18 alerting and answering) (step 38).

The initial call or service set-up stage uses signalling resources 16, 17 only. If the service request is denied at that point then the network has not had to provide any traffic capacity. In other words the call request is validated before the communications links 19, 15 are established, thus offering greater efficiency in the use of the capacity of the system.

Because the system is a mobile network (a cellular network, for example), the link 14 between the terminal 10 and the network interface unit 11 is not permanently dedicated to the terminal. The communications resources to support this link 14 need not be dedicated to the service or call attempt until the service control unit 13 determines whether they are necessary.

Service requests, including ordinary call requests, are routed from the terminal 10 to the service control unit 13. Some of these service requests may require no communications connection to be set up. For example, if a call is failed, for example because the number dialled does not correspond to a recognised destination, or is barred from use by the originating terminal 10, or because the remote terminal 18 cannot be located (e.g. a switched-off mobile unit), the service control unit 13 may transmit a control message back to the terminal 10, using the signalling connection 17 (in the reverse direction) and the connection 14 (which, as explained above need also only be a signalling connection), to cause the calling terminal 10 to respond in a predetermined manner, such as by displaying an error message. As a specific example, if a terminal 10 is barred from making outgoing calls, or certain classes of outgoing call, the service control unit 13 may transmit a signal to the terminal to cause a suitable message such as '999 calls only' or 'no international calls' to be displayed on a display unit forming part of the terminal 10. Messages may be used for other purposes, such as to indicate the presence of a voice message stored in the voice mailbox 20.

In addition to the switch 12, the network interface unit 11 may be connectable to one or more service terminations by means of further communications links 19a. Such service terminations may, for example, include a 'voice mailbox' 20 for storing messages for the user of the terminal 10 associated with the network interface unit 11. If the service control unit 13 recognises a failed call attempt from a remote terminal 18 to the terminal 10, the service control unit diverts the call via the switch 12 to the voice mailbox 20 instead of to the network interface 11 and thus the terminal 10. This process is essentially that described with reference to FIG. 2b, the calling terminal in this case being the remote terminal 18, the intended called terminal being the terminal 10, and the actual called terminal (to which the connection is established in step 37) being the voice mailbox 20. The user of the terminal 10 may be advised of the presence of such messages by means of a control message transmitted by the service control unit 13 to the terminal 10 at a suitable time (e.g. the next time the terminal 10 is detected going "on-hook"), as described above.

When the user of the terminal 10 wishes to retrieve the message he transmits a control signal. This control signal is recognised by the service control unit 13, which then transmits a signal to the voice mailbox 20 over the signalling link 16a to establish a direct communications connection 19a between the user's voice mailbox 20 and the network interface unit 11, without the use of the switch 12, to allow the user to replay the previously-stored message.

What is claimed is:

1. A switched mobile telecommunications network for providing communications connections between mobile network terminations, the network comprising:

one or more mobile network terminations;

service processing means for providing services to or for the mobile network terminations;

the service processing means being initially accessible by service requests from the mobile network terminations by signaling connections, without establishing a communications connections with the mobile network terminations, wherein the service processing means includes means for enabling transmission of a message responsive to the service request to the network termination making the request when the service request is not granted; and switching means controllable by the service processing means in order to establish a communications connection with the mobile network termination making a service request as part of the same transaction as the service request if a communications connection is required by the service requested by the mobile network termination.

2. A switched mobile telecommunications network as claimed in claim 1, wherein in the network service requests from a mobile network termination to establish a communications connection with a second network termination are first directed to the service processing means, the service processing means including means for determining whether the request is executable, said service processing means being operable, on determining that the request is executable, to direct the switching means to establish the communications connection.

3. A switched mobile telecommunications network as claimed in claim 1, wherein in the network requests from a mobile network termination to establish a service not requiring a communications connection are directed to the service processing means, and the service processing means is operable to provide the service without the establishment of a communications connection between the switching means and the mobile network termination.

4. A switched mobile telecommunications network as claimed in claim 1, wherein the network further comprises one or more network service terminations selectively connectable to one or more of the network terminations under the control of the service processing means to provide a communications connection.

5. A method of operating a switched mobile telecommunications network, the method being such that all service requests are initially directed from their originating network terminations by establishing a signaling connection to a service processing means, without establishment of a communications connection with a mobile network termination, and the service processing means provides services to a network termination over the signaling connections, the service processing means also controlling switching means to establish a communications connection with the network termination making a service request as part of the same transaction as the service request if a communications connection is required by the service requested and enabling transmission of a message responsive to the service request to the network termination making the request when the service request is not granted.

6. A method according to claim 5, including the further step that when the service request is a request from a first mobile network termination to establish a communications connection with a second network termination, the service processing means controls switching means to establish the required communications connection.

7. A method according to claim 5, wherein when a request from a mobile network termination to establish a service not requiring a communications connection is directed to the service processing means, the service processing means provides the service without establishing a communications connection to the mobile network termination.

8. A method according to claim 7, wherein the service processing means, on receiving an executable call request from a mobile network termination, establishes a communication connection through a switching means between the mobile network termination and a second network termination, and on receiving a non-call service request or non-executable call request establishes a communication request with a network service termination.

9. A switched mobile telecommunications network comprising:
   one or more mobile network terminations;
   a service processor providing services to or for said mobile network terminations, said service processor being initially accessible by service requests from the mobile network terminations by signaling connections, without requiring establishment of a communications connection with a mobile network terminations wherein the service processor includes means for enabling transmission of a message responsive to the service request to the network termination making the request when the service request is not granted; and
   a switch controllable by said service processor to establish a communications connection with the mobile network termination making a service request as part of the same transaction as the service request if a communications connection is required by the service requested by the mobile network termination.

10. The switched mobile telecommunications network according to claim 9, wherein said service processor includes means for determining if service requests from a mobile network termination to establish a communications connection with a second mobile network termination is executable, said service processor being operable, upon a determination that a request is executable, to control the switch to establish the communications connection.

11. The switched mobile telecommunications network according to claim 9, wherein said service processor is operable to provide a requested service without establishing a communications connection between the switch and the mobile network termination.

12. The switched mobile telecommunications network according to claim 11, wherein the service processor includes a transmitter for transmitting a control message to the network termination.

13. The switched mobile telecommunications network according to claim 9, further comprising:
   one or more network service terminations selectively connectable to one or more of the mobile network terminations, under control of the service processor, to provide a communications connection.

14. A method of operating a switched mobile telecommunications network, including one or more mobile network terminations, comprising the steps of:
   providing services to or for the mobile network terminations;
   directing service requests from an originating network termination by establishing a signaling connection to a service processor without establishing a communications connection with a network termination;
   enabling transmission of a message responsive to the service request to the network termination making the request when the service request is not granted; and
   establishing a communications connection with the network termination which requested the service as part of the same transaction as the service request if a communications connection is required by the service requested by the network termination.

15. The method according to claim 14, wherein a required communications connection is established when the service request is from a first mobile network termination to establish a communications connection with a second network termination.

16. The method according to claim 15, further including the step of transmitting a control message to the mobile network termination.

17. The method according to claim 15, further comprising the step of:
   receiving an executable call request from a mobile network termination;
   establishing a communications connection through a switch between the mobile network termination and a second network termination; and
   establishing a communication request with a network service termination when a non-call service request or non-executable call request is received.

18. A switched mobile telecommunications network for providing communications connections between mobile network terminations, the network comprising:
   one or more mobile network terminations;
   service processing means for providing services to or for the mobile network terminations;

the service processing means being initially accessible by service requests from the mobile network terminations by signaling connections, without establishing a communications connections with the mobile network terminations, wherein the service processing means provides an indication to the network termination making the request that the service request is not granted; and switching means controllable by the service processing means in order to establish a communications connection with the mobile network termination making a service request as part of the same transaction as the service request if a communications connection is required by the service requested by the mobile network termination.

19. A method of operating a switched mobile telecommunications network, including one or more mobile network terminations, comprising the steps of:

providing services to or for the mobile network terminations;

directing service requests from an originating network termination by establishing a signaling connection to a service processor without establishing a communications connection with a network termination;

providing an indication to the network termination making the request that the service request is not granted; and establishing a communications connection with the network termination which requested the service as part of the same transaction as the service request if a communications connection is required by the service requested by the network termination.

* * * * *